(12) United States Patent
Beeson et al.

(10) Patent No.: US 10,599,605 B2
(45) Date of Patent: *Mar. 24, 2020

(54) SYSTEM AND METHOD FOR ABSTRACTING SATA AND/OR SAS STORAGE MEDIA DEVICES VIA A FULL DUPLEX QUEUED COMMAND INTERFACE TO INCREASE PERFORMANCE, LOWER HOST OVERHEAD, AND SIMPLIFY SCALING STORAGE MEDIA DEVICES AND SYSTEMS

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: CONCURRENT VENTURES, LLC, Johns Creek, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,849

(22) Filed: Aug. 31, 2018

(65) Prior Publication Data

US 2018/0373667 A1    Dec. 27, 2018

Related U.S. Application Data

(63) Continuation of application No. 15/388,970, filed on Dec. 22, 2016, now Pat. No. 10,067,904, which is a continuation of application No. 14/099,833, filed on Dec. 6, 2013, now Pat. No. 9,529,767.

(51) Int. Cl.
*G06F 13/42* (2006.01)
*G06F 13/364* (2006.01)
*G06F 13/40* (2006.01)

(52) U.S. Cl.
CPC .......... *G06F 13/426* (2013.01); *G06F 13/364* (2013.01); *G06F 13/4022* (2013.01); *G06F 13/4282* (2013.01); *G06F 2213/0026* (2013.01)

(58) Field of Classification Search
CPC .. G06F 13/385; G06F 13/4282; G06F 3/0626; G06F 2213/0038; G06F 3/0661
See application file for complete search history.

(56) References Cited

U.S. PATENT DOCUMENTS

| | | | | |
|---|---|---|---|---|
| 7,953,917 | B2* | 5/2011 | Seto | G06F 13/4027 710/10 |
| 2008/0162987 | A1* | 7/2008 | El-Batal | G06F 3/0616 714/6.12 |
| 2012/0324137 | A1* | 12/2012 | Jinno | G06F 3/0605 710/306 |

* cited by examiner

*Primary Examiner* — Idriss N Alrobaye
*Assistant Examiner* — Richard B Franklin
(74) *Attorney, Agent, or Firm* — Womble Bond Dickinson (US) LLP (57) ABSTRACT

A simplified host accesses SATA and SAS storage media devices by abstracting the SATA and SAS protocols with one full duplex protocol that supports full command queuing to each storage media device, whether SATA or SAS, where the abstraction protocol is performance-centric and supports common high-level read and write access to a pool of storage media devices, each of which may have a SATA or SAS interface. The abstraction protocol is link-agnostic and may be carried via a multiplicity of direct attach or networked interfaces, including but not limited to PCIe, Ethernet (e.g., 1 GbE, 10 GbE, 40 GbE, or 100 GbE), Infiniband, ThunderBolt, Firewire, USB, and/or custom interfaces.

18 Claims, 9 Drawing Sheets

SYSTEM AND METHOD FOR ABSTRACTING SATA AND/OR SAS STORAGE MEDIA DEVICES VIA A FULL DUPLEX QUEUED COMMAND INTERFACE TO INCREASE PERFORMANCE, LOWER HOST OVERHEAD, AND SIMPLIFY SCALING STORAGE MEDIA DEVICES AND SYSTEMS

BACKGROUND OF THE INVENTION

Field of Invention

The present invention relates generally to the field of storage devices. More specifically, the present invention is related to a system and method for abstracting SATA and/or SAS storage media devices via a full duplex queued command interface to increase performance, lower host overhead, and simplify scaling storage media devices and systems.

Discussion of Related Art

The present state of the art for directly interfacing to a storage media device (rotational hard drive, solid state drive, ram drive, etc.) is to use interface protocols such as SATA (Serial ATA, where ATA=Advanced Technology Attachment) or SAS (Serial Attached SCSI). Both of these interfaces are rooted in much older parallel interfaces (PATA and SCSI). The general protocols remain unchanged from the original parallel specifications, they are simply now transported via serial interface rather than shared access bidirectional parallel busses. In the case of SATA, this limits the high-speed full duplex serial link to effectively half duplex as full command queuing and out of order responses are not natively supported. While Native Command Queuing (NCQ) is supported by a subset of SATA storage media devices, it only addresses some data transfers, not all commands and typically does not support interleaving read and write commands. SAS supports Tagged Command Queuing (TCQ) to overcome some of these limitations with SATA. The host must support and manage both protocols when accessing a mixture of devices (some SATA, some SAS). The host software layers interfacing to SATA or SAS must support their high protocol overhead.

SATA may have a Port Multiplier and SAS may have a Port Expander. Each of these devices split an exiting SATA or SAS link, respectively, into additional ports. Either SATA or SAS protocol is the path into these devices from the host, thus the host still must deal with SATA or SAS. In addition, this link bandwidth between the Multiplier/Expander and the host is shared across the storage media devices downstream. SATA Port Multipliers are typically used to increase storage capacity, subdividing the bandwidth between the controller and the Port Multiplier. SATA Port Multipliers cannot be cascaded, limiting the amount of increased storage capacity. Furthermore, not all SATA controllers support Port Multipliers. SAS Port Expanders may also be used to increase storage capacity, however, also allow several SAS links to the host to be grouped together (ganged) as one port to increase bandwidth between the controller and the Port Multiplier as well. It is possible for a SAS interface to carry SATA via SAS-STP (SAS SATA-Transport-Protocol).

Figure 1:
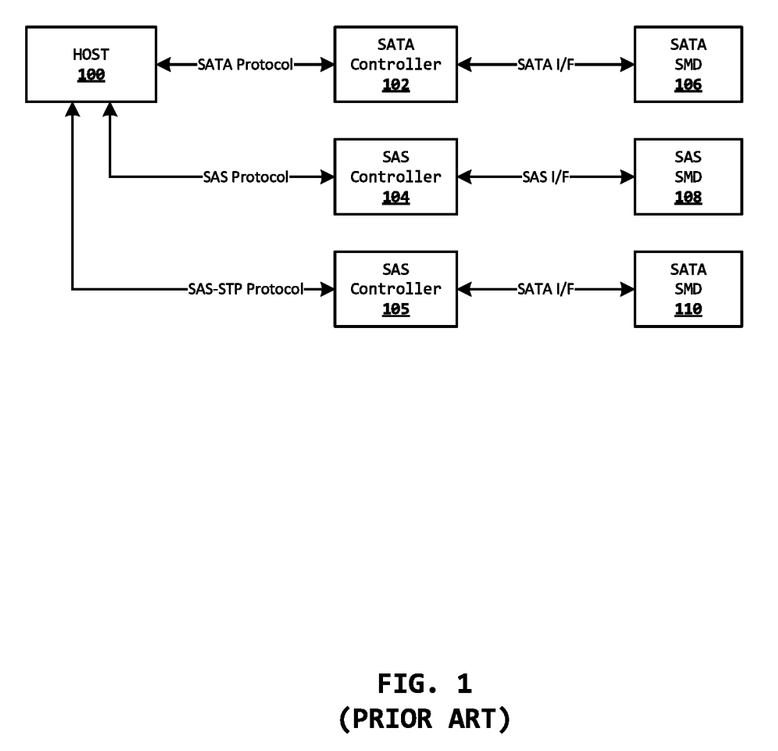
FIG. 1 illustrates a prior art host communicating with a SATA and SAS controllers via SATA, SAS, or SAS-STP protocol.

In prior art, as depicted in FIG. 1, the host computer or processing element 100 supports SATA and/or SAS as a means to communicate with SATA storage media devices (SATA SMD) 106 & 110 and SAS storage media devices (SAS SMD) 108, respectively. The physical interface to the SMDs is made via a SATA controller 102 or SAS controllers 104 and 105, each communicating with SMDs via a serial interface. A SAS controller is able to interface with a SAS SMD (e.g., SAS controller 104 interfacing with SAS SMD 108) as well as a SATA SMD (e.g., SAS controller 105 interfacing with SATA SMD 110), where SATA SMD is supported by the SAS-STP (SAS SATA-Transport-Protocol). A SATA controller is able to interface only to a SATA SMD (i.e., SATA controller 102 is able to interface only to SATA SMD devices like SATA SMD 106).

Figure 2:
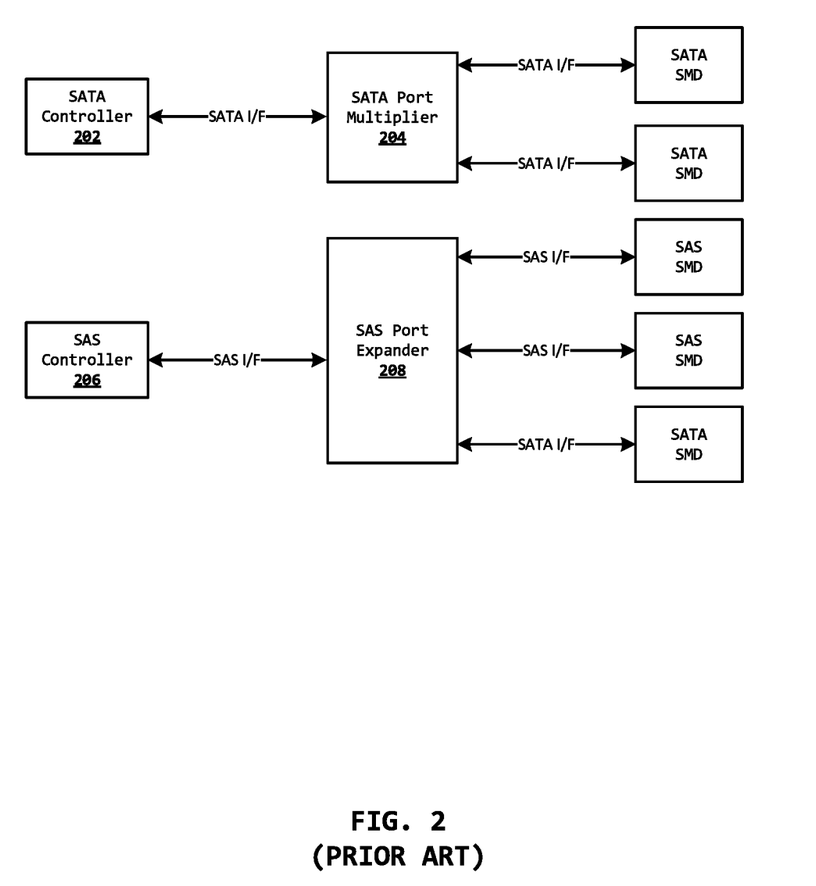
FIG. 2 illustrates a prior art SATA controller communicating with a SATA port multiplier and a SAS controller communicating with a SAS expander.

Optionally, as shown in FIG. 2, a SATA controller 202 may interface to a port multiplier 204 to connect to one or more SATA SMDs. Likewise, a SAS controller 206 may interface to a port expander 208 to connect to one or more SAS SMDs or SATA SMDs.

However, prior art systems such as the ones described above do not provide a system and method for abstracting SATA and/or SAS storage media devices via a full duplex queued command interface to increase performance, lower host overhead, and simplify scaling storage media devices and systems. Embodiments of the present invention are an improvement over prior art systems and methods.

SUMMARY OF THE INVENTION

In one embodiment, the present invention provides for a routable packet-switched network supported by an abstraction protocol comprising: at least one host; a master controller, the master controller comprising a master processing element, an optional master memory, a master controller interface to communicate with the host, and at least one master controller control link interface; and at least one edge controller, the edge controller comprising an edge processing element, an optional edge memory, an edge controller control link interface to communicate with the master controller via the master controller control link interface, and at least one storage media device interface to communicate with at least one storage media device, wherein the master controller and the edge controller communicate via the abstraction protocol, the abstraction protocol comprising a full-duplex protocol supporting full command queuing for the at least one storage media device.

In another embodiment, the present invention provides for a routable packet-switched network supported by an abstraction protocol comprising: at least one host; a first master controller, the first master controller comprising a first master processing element, an optional first master memory, a first master controller interface to communicate with the host, and at least one first master controller control link interface; and at least one first edge controller, the first edge controller comprising: a first edge processing element, an optional first edge memory, a first edge controller control link interface to communicate with the first master controller via the first master controller control link interface, an optional forward link interface communicating with a second edge controller to forward abstract protocol packets from said first master controller to said second edge controller, said second edge controller comprising a second edge processing element, an optional second edge memory, a second edge controller control link interface allowing said second edge processing element to communicate with the forward link interface, and at least one second master controller control link interface to communicate with said second edge controller; an optional second master controller, the second master controller comprising a second master processing element, an optional second master memory, a second master controller interface to communicate with the first edge processing element, and at least one second master controller control link interface to communicate with the second edge controller; and at least one storage media device interface to communicate with at least one storage media device, wherein the first and second master controllers, the first edge controller and the second edge controller communicate via the abstraction protocol, the abstraction protocol comprising a full-duplex protocol supporting full command queuing for the at least one storage media device.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

This invention simplifies a host that accesses SATA and SAS storage media devices by abstracting the SATA and SAS protocols with one full duplex protocol that supports full command queuing to each storage media device, whether SATA or SAS. The invention is comprised of both hardware (system—architecture) and software (method—abstraction protocol). The simplified abstraction protocol provides high-level access commands to storage media devices. A high-level command may ultimately resolve to several commands at the SATA or SAS interface, allowing the host to issue and track fewer commands. An example of which is moving a larger amount of data with one command than the SATA or SAS protocols support natively. The storage media devices' SATA or SAS interfaces are pushed to the edge, away from the host and toward the storage media device for which it supports. Pushing the SAS/SATA protocol to the edge simplifies the host/controller since it does not implement the legacy SAS/SATA protocol, it can do what fits its application best. Because SAS/SATA are pushed to the edge and abstracted to the host, SATA and SAS can be comingled without impacting the host (host is SAS/SATA-agnostic). Even when SATA is tunneled over SAS (STP) the host is using the SATA/STP protocol. The host generally need not be aware of storage media devices' interface protocol during operation. Furthermore, recoverable storage media device errors, such as retries, may be handled at the edge, local to the storage media device, offloading the task from the host. In the event data duplication is desired, this also may be handled at the edge, offloading the task from the host. This offload may be important with SATA if NCQ is to be used, as any remaining queued read or write commands will be flushed if an error occurs, requiring those commands to be re-issued. The abstraction protocol supports flow control between the host and the edge. Since SATA and SAS handle flow control differently, this storage media device flow control is dealt with at the edge rather than placing the burden on the host.

This abstraction protocol is performance-centric and supports common high-level read and write access to a pool of storage media devices, each of which may have a SATA or SAS interface. The abstraction protocol is link-agnostic and may be carried via a multiplicity of direct attach or networked interfaces, including but not limited to PCIe, Ethernet (e.g., 1 GbE, 10 GbE, 40 GbE, or 100 GbE), Infiniband, USB, ThunderBolt, Firewire, and/or custom interfaces. The abstraction protocol link bandwidth need not be related to the bandwidth of the individual storage media devices' SATA or SAS interface. The data being written to or read from a storage media device may be pushed by the source or may be pulled by the destination. For example, when the link is Ethernet it is typically best to send the bulk data along with the command packet in case of write and along with the response packet in the case of read (pushed). When the link is PCIe it is typically best that the bulk data be retrieved separately from issuing a command or response, when the command is ready to execute or a response is received (pulled).

The abstraction protocol supports packet-switched routable fabric and error recovery. Routing may be based on logical address, WWN (World Wide Number—a unique global ID number), or physical address. Logical address or WWN may be mapped to a physical address (e.g. by table lookup). This mapping may be static or dynamically updated based upon a discovery process as storage media devices are (i) inserted or removed from the system and/or (ii) powered on or off.

Figure 3:
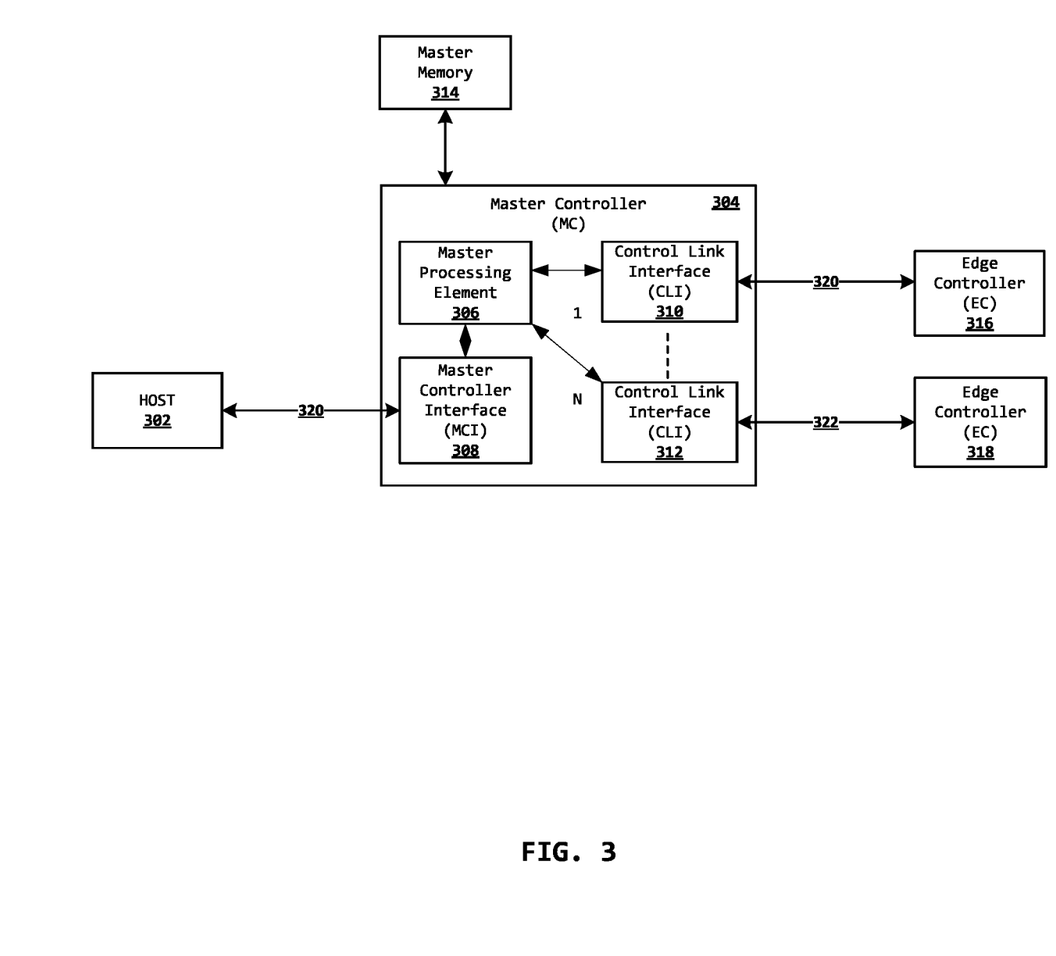
FIG. 3 illustrates one example of the present invention's master controller communicating with a host and edge controllers.

A master controller 304, as depicted in FIG. 3, contains (i) one or more master processing elements 306 that carries out the processing of the master side of the abstraction protocol and communicates with at least one host 302 via a master controller interface 308 connected to the host 302 by a host link 320 and (ii) one or more control link interfaces 310 through 312, which communicate with one or more edge controllers 316 through 318 via control links 320 and 322. The master controller 304 may optionally have its own master memory 314 for use by the functions contained within for processing, buffering, queuing, and the like. The master memory 314 may be internal to the Master Controller 304 or external, comprised of SRAM, DRAM, RLDRAM, FLASH, or a combination thereof. Together, the host 302, the master controller 304, and edge controllers 316 through 318 form a routable packet-switched network supported by an abstraction protocol. It is possible that one or more hosts, master controllers, and/or edge controllers exist in the same physical device, such as Field Programmable Gate Array (FPGA) or Application Specific Integrated Circuit (ASIC), or different devices in any combination. The host link 320 may be implemented with a directly-addressable memory interface, Universal Serial Bus (USB), Ethernet, Peripheral Component Interconnect Express (PCIe), Infiniband, ThunderBolt, Firewire, and/or other common or custom interconnect technologies. The control links 320 & 322 may also be implemented with a directly-addressable memory interface, USB, Ethernet, PCIe, Infiniband, ThunderBolt, Firewire, and/or other common or custom interconnect technologies. Each of the host link 320 and control links 320 & 322 may be implemented with different interconnect technologies, they need not be the same. For example the host link 320 may be implemented with PCIe while the control links 320 & 322 may be implemented with 10 Gb Ethernet.

Figure 4A:
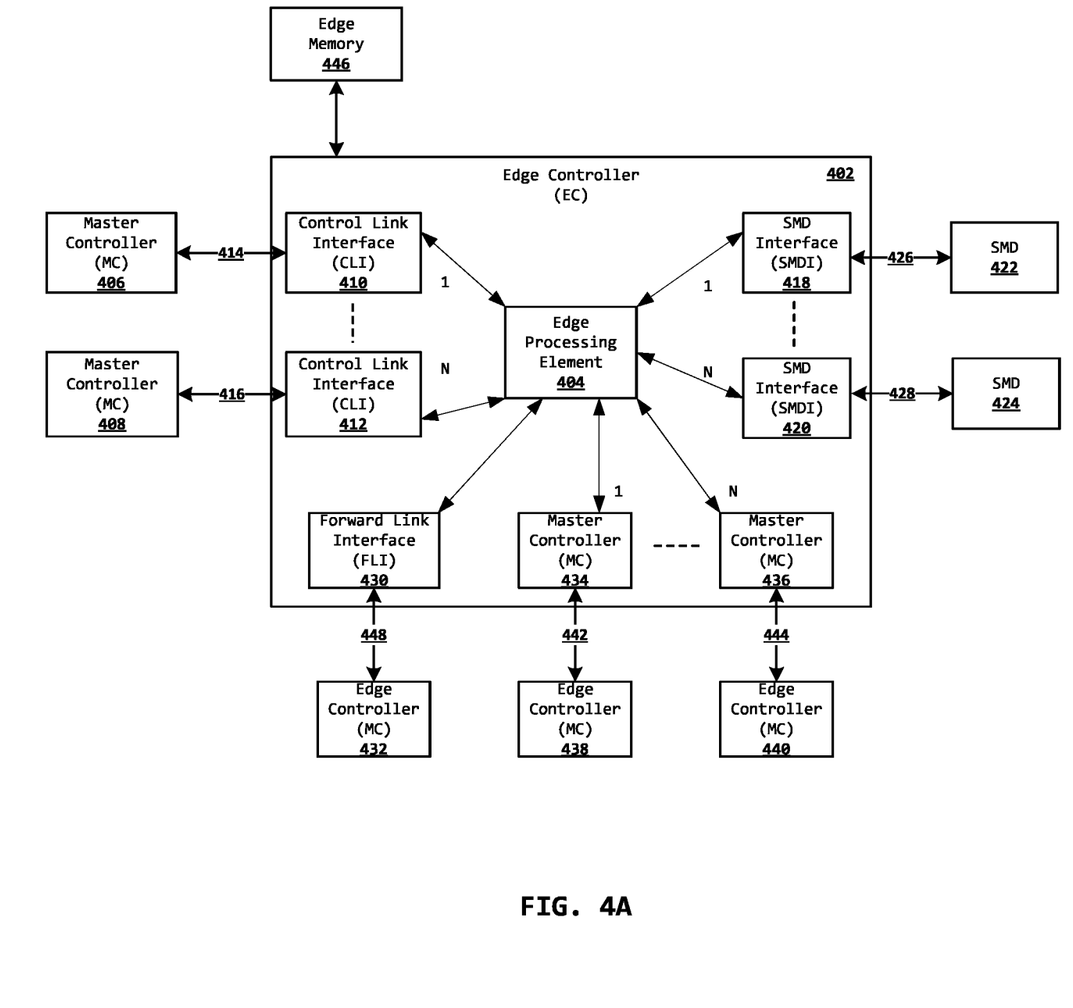
FIG. 4A through 4C illustrate various non-limiting examples of the present invention's edge controller.

FIG. 4A depicts a non-limiting example of an edge controller. The edge controller 402 contains (i) one or more edge processing elements 404 that carries out the processing of the edge side of the abstraction protocol and communicates with one or more master controllers 406 & 408 via control link interfaces 410 & 412 communicating with a master controllers 406 & 408 via control links 414 & 416; (ii) one or more SMD interfaces 418 & 420 which communicate with one or more SMDs 422 & 424 via SATA and/or SAS links 426 and 428; (iii) optionally, one or more forward link interfaces 430 communicating with other edge controllers 432 via control links 448 used to forward those abstract protocol packets from master controllers 406 or 408 (received via control link interfaces 410 & 412 that are not destined for the edge controller 402 that received them) to another edge controller 432; and (iv) optionally, one or more master controllers 434 & 436 communicating with other edge controllers 438 & 440 via control links 442 & 444 when an edge processing element 404 wishes to author abstract protocol messages to other edge controllers 438 & 440. A forward link interface 430 may be functionally equivalent to a control link interface 410 & 412 in certain embodiments. An edge controller 402 may optionally have its own edge memory 446 for use by the functions contained within for processing, buffering, queuing, and the like. The edge memory 446 may be internal to the Edge Controller 402 or external, comprised of SRAM, DRAM, RLDRAM, FLASH, or a combination thereof. It is possible that multiple edge controllers share the same edge memory when physical proximity of edge controllers allows for such sharing. It is also possible that the edge memory and master memory associated with a master controller may be combined into one when physical proximity of a master controller and an edge controller allow for such combining.

Figure 4B:
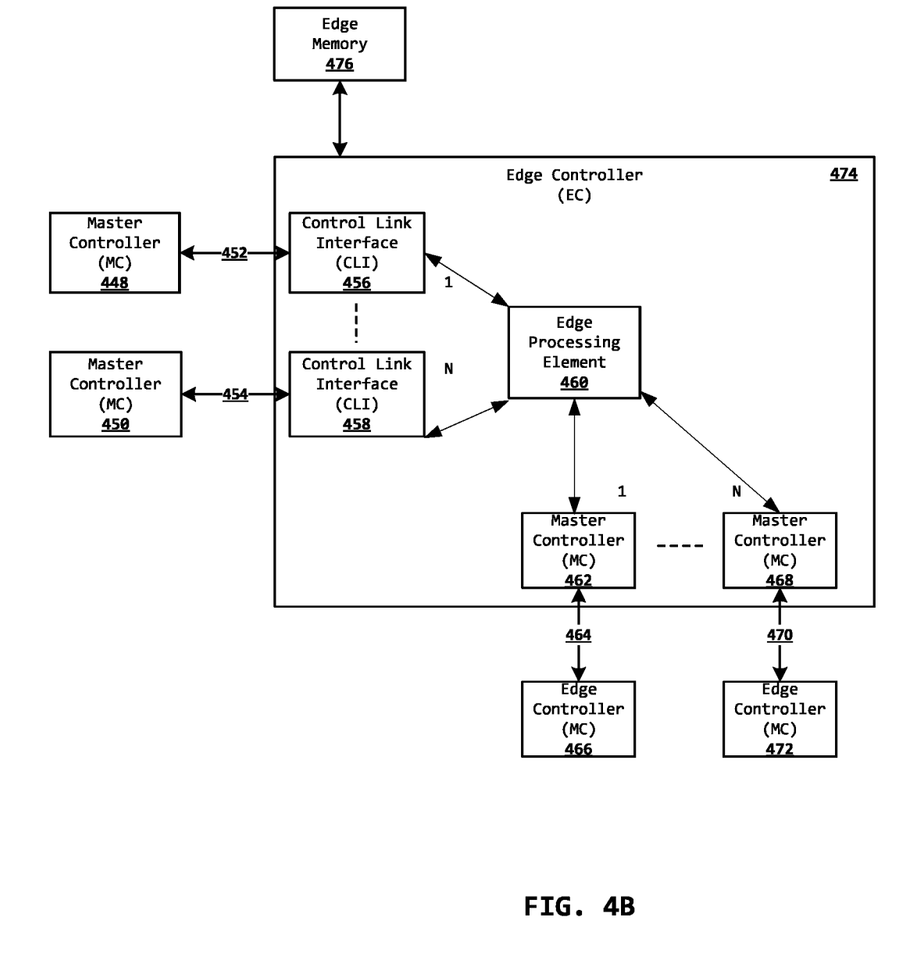

FIG. 4B depicts another non-limiting example of an edge controller that acts as a forwarding/routing device. The edge controller 474 contains (i) one or more edge processing elements 460 that carries out the processing of the edge side of the abstraction protocol and communicates with one or more master controllers 448 & 450 via control link interfaces 456 & 458 communicating with a master controllers 448 & 450 via control links 452 & 454; and (ii) one or more master controllers 462 & 468 communicating with other edge controllers 466 & 472 via control links 464 & 472 when an edge processing element 460 wishes to author abstract protocol messages to other edge controllers 466 & 472. It should be noted that in this embodiment, edge controller 474 acts as a forwarding/routing device as there are no storage media devices connected to it. An edge controller 474 may optionally have its own edge memory 476 for use by the functions contained within for processing, buffering, queuing, and the like. The edge memory 476 may be internal to the Edge Controller 474 or external, comprised of SRAM, DRAM, RLDRAM, FLASH, or a combination thereof. It is possible that multiple edge controllers share the same edge memory when physical proximity of edge controllers allows for such sharing. It is also possible that the edge memory and master memory associated with a master controller may be combined into one when physical proximity of a master controller and an edge controller allow for such combining.

Figure 4C:
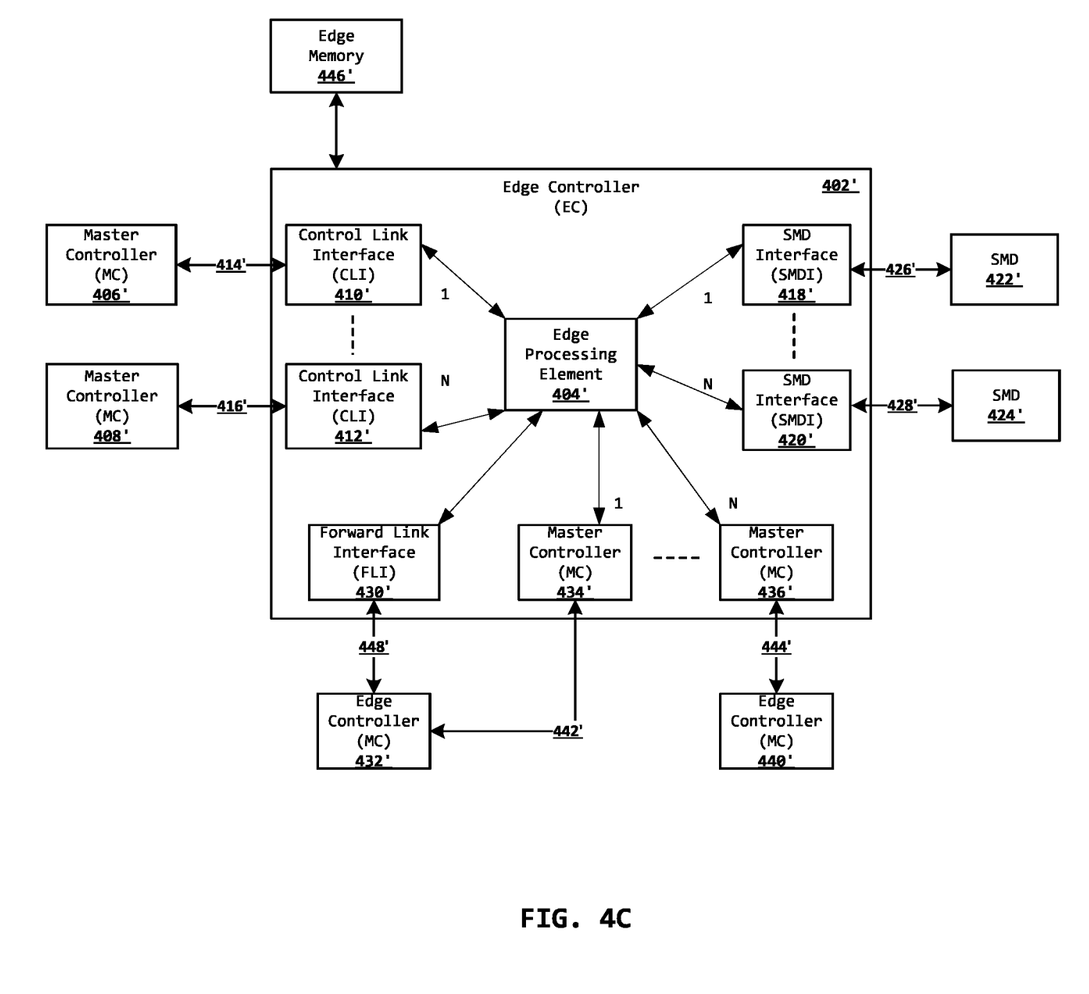

FIG. 4C depicts another non-limiting example of an edge controller, which is a variation of the edge controller shown in FIG. 4A. The edge controller 402' contains (i) one or more edge processing elements 404' that carries out the processing of the edge side of the abstraction protocol and communicates with one or more master controllers 406' & 408' via control link interfaces 410' & 412' communicating with a master controllers 406' & 408' via control links 414' & 416'; (ii) one or more SMD interfaces 418' & 420' which communicate with one or more SMDs 422' & 424' via SATA and/or SAS links 426' and 428'; (iii) optionally, one or more forward link interfaces 430' communicating with another edge controller 432' via control links 448' used to forward those abstract protocol packets from master controllers 406' or 408' (received via control link interfaces 410' & 412' that are not destined for the edge controller 402' that received them) to another edge controller 432'; and (iv) optionally, one or more master controllers 434' & 436', master controller 434' communicating with edge controller 432' over control link 442' and master controller 436' communicating with edge controllers 440' via control links 444' when an edge processing element 404' wishes to author abstract protocol messages to edge controllers 432' and/or 440'. A forward link interface 430' may be functionally equivalent to a control link interface 410' & 412' in certain embodiments. An edge controller 402' may optionally have its own edge memory 446' for use by the functions contained within for processing, buffering, queuing, and the like. The edge memory 446' may be internal to the edge controller 402' or external, comprised of SRAM, DRAM, RLDRAM, FLASH, or a combination thereof. It is possible that multiple edge controllers share the same edge memory when physical proximity of edge controllers allows for such sharing. It is also possible that the edge memory and master memory associated with a master controller may be combined into one when physical proximity of a master controller and an edge controller allow for such combining. For the sake of simplicity, control links 448' and 442' are shown as connecting individually to edge controller 432', however, they may be combined into a single connection to Edge Controller 432' (e.g. muxed or multiplexed together).

Figure 5A:
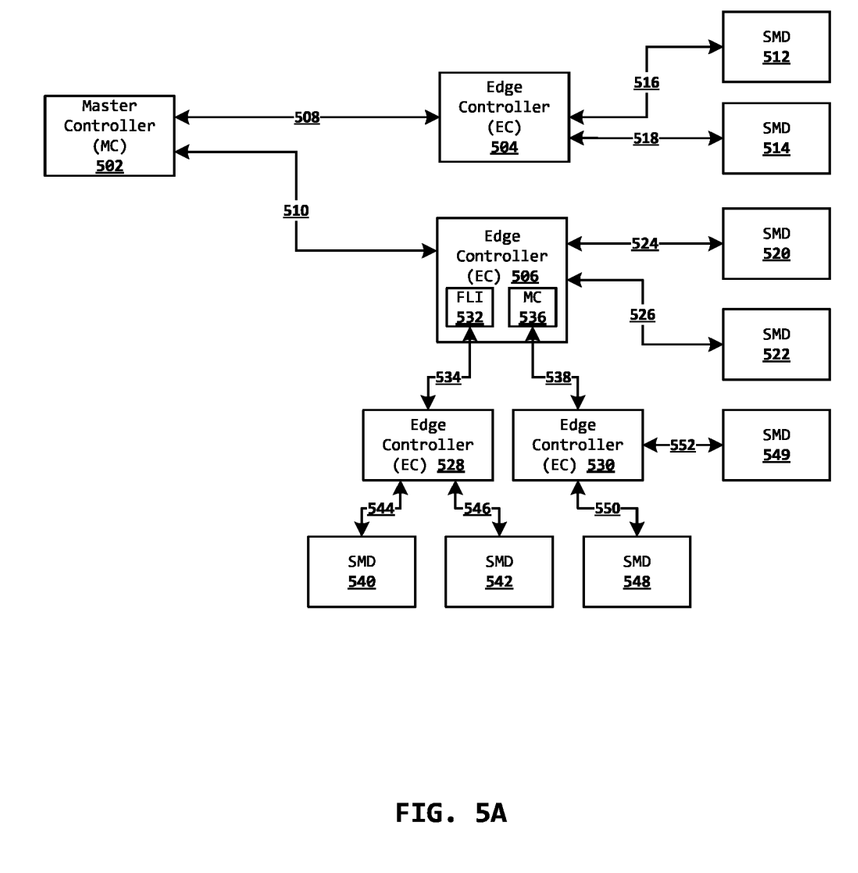
FIGS. 5A and 5B illustrate a system level overview of non-limiting examples of the present invention's master controller interacting with one edge controller that is communication with storage media devices and another edge controller that is in communication with other edge controllers and other storage media devices.

In one embodiment, as depicted in FIG. 5A, a master controller 502 communicates with one or more edge controllers 504 & 506, via control links 508 and 510, respectively. Edge controller 504 communicates with multiple SMDs 512 through 514 via SATA and/or SAS links 516 & 518 depending on the type of SMD (i.e., SATA or SAS). Edge controller 506 communicates with multiple SMDs 520 through 522 via SATA and/or SAS links 524 & 526 depending on the type of SMD (i.e., SATA or SAS), as well as communicating with two other edge controllers 528 and 530. Edge controller 528 communicates with the edge controller 506 via a forward link interface 532 and control link 534. In this case, abstraction protocol packets from master controller 502 may be forwarded or proxy to another edge controller 528 based on certain criteria, including but not limited to, broadcast or destination that is not local to Edge Controller 506. Another edge controller 530 communicates with edge controller 506 via master controller 536 and control link 538. In this case, edge controller 506 may be servicing an abstraction protocol command in which some action is required at edge controller 506 as well as some action at a different edge controller 530, this includes splitting on abstraction protocol command into multiple abstraction protocol commands each destined for one or more other edge controllers 530. Edge controller 528 communicates with multiple SMDs 540 & 542 via SATA and/or SAS links 544 & 546 depending on the type of SMD (i.e., SATA or SAS). Edge controller 530 communicates with multiple SMDs 548 & 549 via SATA and/or SAS links 550 & 552 depending on the type of SMD (i.e., SATA or SAS). A multiplicity of control links 508, 510, 534, and 538 may be implemented with the same or different interconnect technology, including but not limited to directly-addressable memory interface, USB, Ethernet, PCIe, Infiniband, Thunderbolt, and/or Firewire. In certain cases, such as Ethernet, each Control Link 508, 510, 534, and/or 538 may be the same network.

Figure 5B:
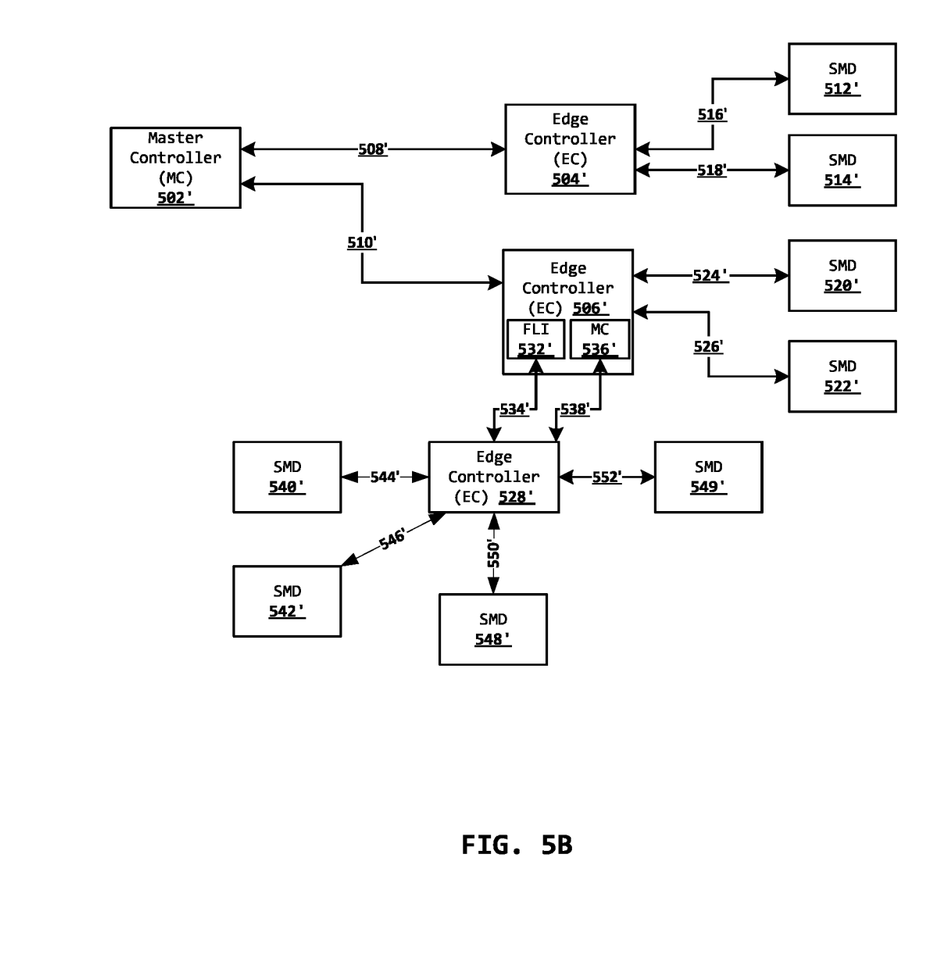

In another embodiment, as depicted in FIG. 5B, a master controller 502 communicates with one or more edge controllers 504' & 506', via control links 508' and 510', respectively. Edge controller 504' communicates with multiple SMDs 512' through 514' via SATA and/or SAS links 516' & 518' depending on the type of SMD (i.e., SATA or SAS). Edge controller 506' communicates with multiple SMDs 520' through 522' via SATA and/or SAS links 524' & 526' depending on the type of SMD (i.e., SATA or SAS), as well as communicating with two other edge controllers 528' and 530'. Edge controller 528' communicates with the edge controller 506' via a forward link interface 532' and control link 534'. In this case, abstraction protocol packets from master controller 502' may be forwarded or proxy to another edge controller 528' based on certain criteria, including but not limited to, broadcast or destination that is not local to edge controller 506'. Edge controller 506' communicates with edge controller 528' via master controller 536' and control link 538'. Edge controller 506' may be servicing an abstraction protocol command in which some action is required at edge controller 506' as well as some action at a different edge controller 528', this includes splitting on abstraction protocol command into multiple abstraction protocol commands each destined for at least one additional edge controllers 528'. Edge controller 528' communicates with multiple SMDs 540', 542', 548', and 549' via SATA and/or SAS links 544', 546', 550', or 552' depending on the type of SMD (i.e., SATA or SAS). A multiplicity of control links 508', 510', 534', and 538' may be implemented with the same or different interconnect technology, including but not limited to directly-addressable memory interface, USB, Ethernet, PCIe, Infiniband, Thunderbolt, and/or Firewire. In certain cases, such as Ethernet, each Control Link 508', 510', 534', and/or 538' may be the same network. For the sake of simplicity, Control Links 534' and 538' are shown as connecting individually to Edge Controller 528', however, they may be combined into a single connection to Edge Controller 528' (e.g. muxed or multiplexed together).

Figure 6:
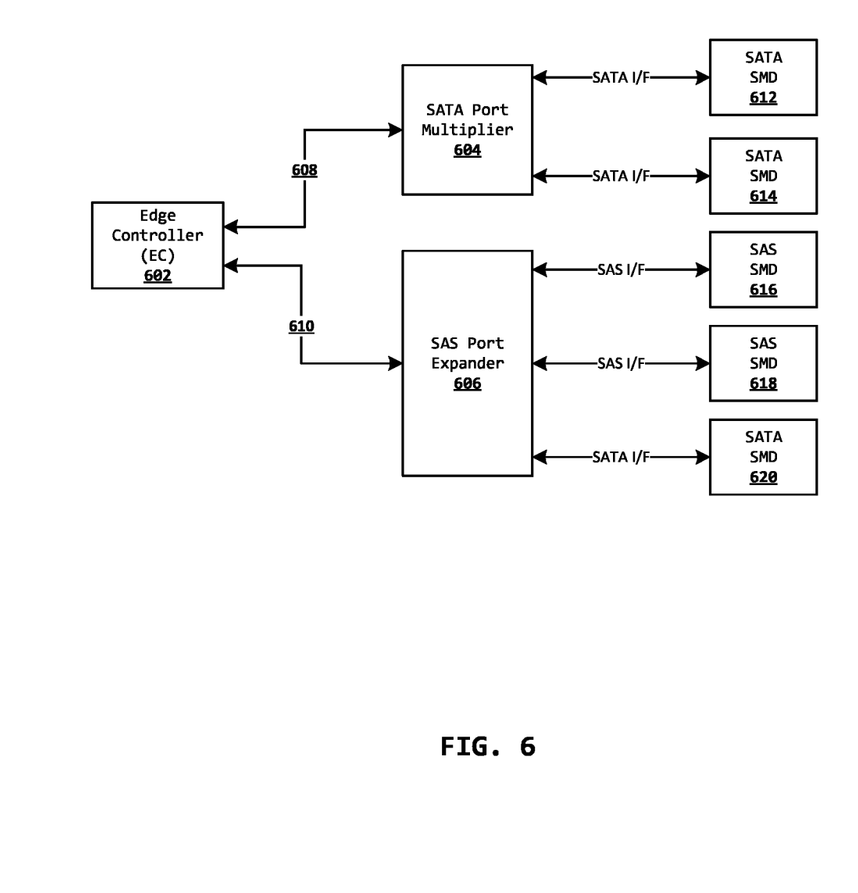
FIG. 6 illustrates the present invention's edge controller that is able to communicate with either a SATA port multiplier or a SAS port expander, or both.

In another embodiment, as depicted in FIG. 6, an edge controller 602 communicates with a SAS port expander 606, which then communicates with one or more SAS and or SATA SMDs 616 through 620. Edge controller 602 may also communicate with a SATA port multiplier 604 via a SATA link 608, which then communicates with one or more SATA SMDs 612 through 614.

While FIG. 6 depicts both a port multiplier 604 and a port expander 606, it should be noted that embodiments with just a port multiplier and just a port expander are within the scope of the invention.

For example, in one embodiment, the present invention provides for a routable packet-switched network supported by an abstraction protocol comprising: at least one host; a master controller, the master controller comprising a master processing element, an optional master memory, a master controller interface to communicate with the host, and at least one master controller control link interface; and at least one edge controller, the edge controller comprising an edge processing element, an optional edge memory, an edge controller control link interface to communicate with the master controller via the master controller control link interface, a port multiplier communicating with a plurality of storage media devices, wherein the master controller and the edge controller communicate via the abstraction protocol, the abstraction protocol comprising a full-duplex protocol supporting full command queuing for the storage media devices.

In another embodiment, the present invention provides for a routable packet-switched network supported by an abstraction protocol comprising: at least one host; a master controller, the master controller comprising a master processing element, an optional master memory, a master controller interface to communicate with the host, and at least one master controller control link interface; and at least one edge controller, the edge controller comprising an edge processing element, an optional edge memory, an edge controller control link interface to communicate with the master controller via the master controller control link interface, and a port expander communicating with a plurality of storage media devices, wherein the master controller and the edge controller communicate via the abstraction protocol, the abstraction protocol comprising a full-duplex protocol supporting full command queuing for the storage media devices.

For the sake of simplicity, the system is described as being within a chassis, it should be noted that the entire system need not be co-located within one chassis or physical location, as one or more individual elements may be located as part of a different chassis/location.

The above-described features and applications can be implemented as software processes that are specified as a set of instructions recorded on a computer readable storage medium (also referred to as computer readable medium). When these instructions are executed by one or more processing element(s) (e.g., one or more processors, cores of processors, or other processing elements), they cause the processing element(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing element and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on/within the circuit itself. In some implementations, such as with FPGAs, software may be used to describe hardware circuits, an example of which are FPGA programming files. Such FPGA programming files may also include computer programs, machine code, microcode, firmware, and other software. The FPGA programming files may be stored within an FPGA, ASIC, computer-readable storage media, machine-readable media, or machine-readable storage media.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Those of skill in the art will appreciate that other embodiments of the disclosure may be practiced in network computing environments with many types of computer system configurations, including personal computers, hand-held devices, multi-processor systems, ASIC-based systems, FPGA-based systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a system and method for abstracting SATA and/or SAS storage media devices via a full duplex queued command interface to increase performance, lower host overhead, and simplify scaling storage media devices and systems. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A routable packet-switched network supported by an abstraction protocol comprising:
   at least one host;
   a master controller, the master controller comprising a master processing element, a master controller interface to communicate with the host, and at least one master controller control link interface; and
   at least one edge controller, the edge controller comprising an edge processing element, an edge controller control link interface to communicate with the master controller via the master controller control link interface, and at least one storage media device interface to communicate with at least one storage media device,
   wherein the master controller and the edge controller communicate via the abstraction protocol, the abstraction protocol comprising a full-duplex protocol supporting full command queuing for the at least one storage media device, wherein the abstraction protocol simultaneously supports both serial ATA (SATA) and serial attached SCSI (SAS) storage media devices, and wherein the edge controller further comprises at least one other master controller further in communication with at least one other edge controller, when the edge processing element associated with the edge controller authors abstract protocol messages intended for the other edge controller.

2. The routable packet-switched network of claim 1, wherein a single high level command issued by the master controller resolves to one or more SATA commands and one or more SAS commands.

3. The routable packet-switched network of claim 1, wherein the abstraction protocol supports serial ATA (SATA).

4. The routable packet-switched network of claim 3, wherein a single high level command issued by the master controller resolves to one or more SATA commands.

5. The routable packet-switched network of claim 1, wherein the abstraction protocol supports serial attached SCSI (SAS).

6. The routable packet-switched network of claim 5, wherein a single high level command issued by the master controller resolves to one or more SAS commands.

7. The routable packet-switched network of claim 1, wherein routing between the master controller and the edge controller is based on any of the following: logical address, world wide number (WWN), or physical address.

8. The routable packet-switched network of claim 7, wherein routing between the master controller and the edge controller is based on the logical address that is mapped to the physical address.

9. The routable packet-switched network of claim 8, wherein mapping between the logical address and the physical address is updated dynamically based on a discovery process as storage media devices are: (a) inserted; (b) removed; (c) powered on; or (d) powered off.

10. The routable packet-switched network of claim 7, wherein routing between the master controller and the edge controller is based on the WWN that is mapped to the physical address.

11. The routable packet-switched network of claim 10, wherein mapping between the WWN and the physical address is updated dynamically based on a discovery process as storage media devices are: (a) inserted; (b) removed; (c) powered on; or (d) powered off.

12. The routable packet-switched network of claim 1, wherein the edge controller further comprises at least one forward link interface in communication with at least one other edge controller and forwarding abstract protocol packets from the master controller to the other edge controller.

13. The routable packet-switched network of claim 1, wherein the master controller and at least one edge controller are implemented in one physical device, the physical device being any of the following: field programmable gate array (FPGA) or application specific integrated circuit (ASIC).

14. The routable packet-switched network of claim 1, wherein the master controller interface communicates with the host via any of the following interfaces: direct-addressable memory interface, USB, PCIe, Ethernet, Infiniband, ThunderBolt, or Firewire.

15. A routable packet-switched network supported by an abstraction protocol comprising:
at least one host;
a first master controller, the first master controller comprising a first master processing element, a first master controller interface to communicate with the host, and at least one first master controller control link interface; and at least one first edge controller, the first edge controller comprising:
a first edge processing element,
a first edge controller control link interface to communicate with the first master controller via the first master controller control link interface,
a second master controller, the second master controller comprising a second master processing element, a second master controller interface to communicate with the first edge processing element, and at least one second master controller control link interface to communicate with a second edge controller, said second edge controller comprising a second edge processing element, a second edge controller control link interface allowing said second edge processing element to communicate with the second master controller; and
at least one storage media device interface to communicate with at least one storage media device, wherein the first and second master controller, the first edge controller and the second edge controller communicate via the abstraction protocol, the abstraction protocol comprising a full-duplex protocol supporting full command queuing for the at least one
storage media device.

16. The routable packet-switched network of claim 15, wherein said first edge controller further comprises a forward link interface communicating with said second edge controller to forward abstract protocol packets from said first master controller to said second edge controller, and at least one second master controller control link interface to communicate with said second edge controller.

17. The routable packet-switched network of claim 15, wherein a single high level command issued by the master controller resolves to one or more SATA commands.

18. The routable packet-switched network of claim 15, wherein a single high level command issued by the master controller resolves to one or more SAS commands.

* * * * *